UNITED STATES PATENT OFFICE.

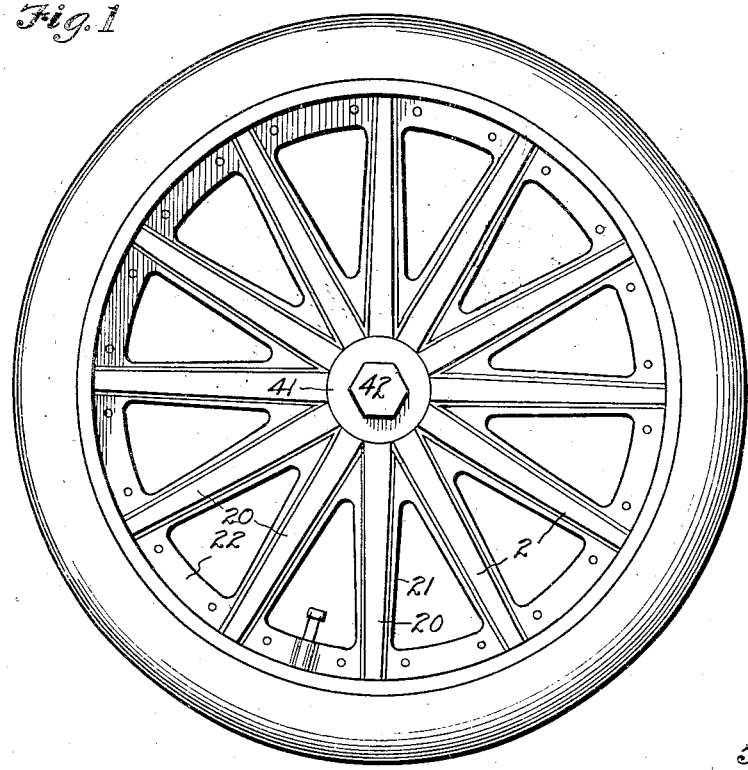
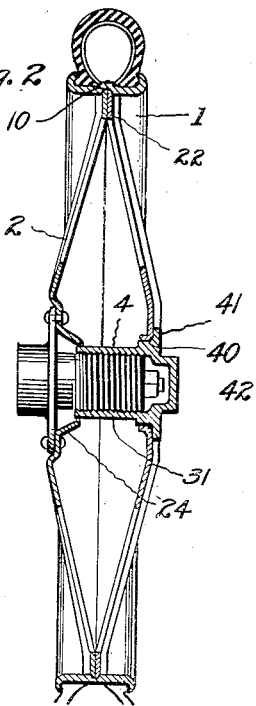
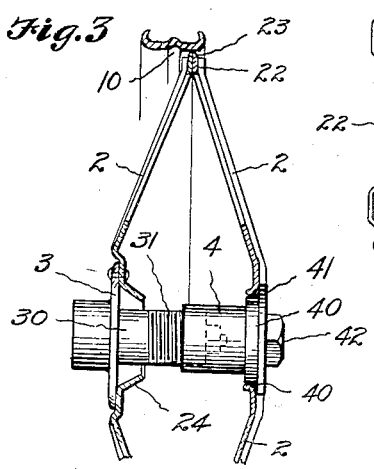
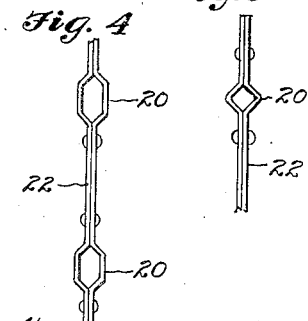

ALVIN H. SHOEMAKER, OF SEATTLE, WASHINGTON.

DEMOUNTABLE-RIM VEHICLE-WHEEL.

1,354,221.	Specification of Letters Patent.	Patented Sept. 28, 1920.

Application filed July 11, 1919. Serial No. 310,092.

*To all whom it may concern:*

Be it known that I, ALVIN H. SHOEMAKER, a citizen of the United States, and resident of the city of Seattle, county of King, State of Washington, have invented certain new and useful Improvements in Demountable-Rim Vehicle-Wheels, of which the following is a specification.

My invention relates to a wheel for a demountable rim.

The object of my invention is to provide a construction under which a wheel with a demountable rim may be made in which the wheel center is diametrically expanded and contracted in order to engage it with and disengage it from a removable rim.

Another object of my invention is to make a wheel of this type in which the wheel center may be made of stamped metal plates.

Other objects may be seen by a study of this specification and the drawings.

The features of my invention which I deem to be new and upon which I desire a patent, will be set forth in the accompanying specification and then particularly defined in the claims.

In the accompanying drawings my invention has been illustrated in the type of construction which I now prefer to use.

Figure 1 is a side view of a wheel made in accordance with my invention.

Fig. 2 is a transverse section of such a wheel showing the parts in the position they will occupy when the rim is secured in place upon the center.

Fig. 3 is a like section showing the position which the parts would occupy when the center is contracted so as to remove the rim therefrom.

Figs. 4 and 5 show the appearance of the outer edge of the wheel centers.

In my invention the rim 1 is provided, on its inner surface, with a recess or recesses adapted to receive portions of the wheel center to interlock the two. As herein illustrated and as I now prefer to make them, such recesses would consist of a shallow groove or channel 10.

The wheel center consists of two sets of spokes connected at their outer ends by a felly section, each set being stamped from a single sheet of metal. While I much prefer to make each set of spokes from a single sheet, I do not, however, wish to limit this invention to making these of a single sheet, as it is evident that they might be made in other ways than this. The essential feature is that they should be secured together so as to be essentially a unitary body when in use.

The spokes 2 are preferably stamped in such a way as to be ribbed, so as to thereby increase their stiffness. In the construction illustrated, the central band 20 is displaced laterally from the original plane of the sheet, the latter being represented by the edges 21, and also by the peripheral band or felly 22. In Figs. 4 and 5 the manner of thickening of the spokes by the flanging operation has been illustrated.

One set of spokes is fixedly secured to a flange 3 of the wheel hub. The driving action of the wheel is thus through the connection between the spokes 2 and the wheel hub flange 3. The other set of spokes may be said to have their inner ends floating or at least are not fixedly secured at their inner ends to any hub. The wheel hub 30 has its outer portion threaded, as shown at 31, and upon this threads the sleeve 4, which sleeve has a band, as 40, upon which the inner ends of the outer sets of spokes rest. A flange 41 which is of still greater diameter, bears against the outer faces of the inner ends of the spokes.

In the normal condition of the wheel center it is sufficiently small in outer diameter that the rim may be placed thereon. If now the sleeve or hub end 4 be turned down upon the hub 31 this will cause the inner ends of the spokes of the two sets to be drawn together into substantially the position shown in Fig. 2. In doing this the rim section 22 of the wheel center is expanded into the groove 10 of the outer rim. In consequence, the rim will be securely fixed upon the center.

The expansion of the rim 22 of the wheel center is possible by reason of the fact that the channeling of the ribs 20 provides a series of yielding points which permits peripheral expansion. The ribbed portion of the spokes is preferably cut slightly shorter than the rim 22, as is illustrated at 23 in Fig. 3. In consequence, the ends of this portion of the spokes bear against the inner surface of the outer rim, while the edge of the rim 22 enters the groove in the demountable rim 1.

The solid center for those spokes which form the inner side of the wheel is provided with an inwardly extending conical projection 24 of such size as to closely fit over the inner end of the collar 4, when the wheel is in position of use, or as shown in Fig. 2. The collar 4 is provided at its outer end with a nut 42 by which it may be turned or I may use any type of construction which will permit turning thereof.

A wheel of the construction illustrated and described may be made very cheaply and be of strong and durable construction. It provides a demountable rim construction which is feasible for use on cars intended for sale at a low price. At the same time the character of construction adapts it for use as a high quality wheel for the best cars.

What I claim as my invention is:

1. In a wheel in combination, a removable rim, a center having a rim section and spokes extending therefrom and divided into two groups which have their inner ends separated axially, and means for drawing together the inner ends of said groups of spokes to thereby expand the rim portion of the wheel center into holding engagement with the removable rim.

2. In a wheel, in combination, a removable rim having a center-receiving recess in its inner surface, a center having a rim and two groups of spokes extending therefrom, the spokes of the two groups being separated axially, and means for varying the axial separation of said groups of spokes to thereby expand the rim part of the center into the said recess of the removable rim or to withdraw it therefrom.

3. A demountable rim wheel construction comprising a rim having recesses in its inner face, a wheel center having a peripherally expandible rim and spokes connected thereto, said spokes being in two groups having their inner ends separated axially of the wheel, and means for varying the separation of the inner ends of the spokes to thereby expand and contract the connected rim to engage the latter with and disengage it from the outer rim.

Signed at Seattle, Washington, this 3rd day of July, 1919.

ALVIN H. SHOEMAKER